US012414846B2

(12) United States Patent
Johnson et al.

(10) Patent No.: US 12,414,846 B2
(45) Date of Patent: Sep. 16, 2025

(54) ORAL IRRIGATOR WITH INTERDENTAL SPACE SENSING

(71) Applicant: KONINKLIJKE PHILIPS N.V., Eindhoven (NL)

(72) Inventors: Mark Thomas Johnson, Arendonk (BE); Bart Gottenbos, Budel (NL); Mart Kornelis-Jan Te Velde, Helmond (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 398 days.

(21) Appl. No.: 18/021,528

(22) PCT Filed: Aug. 12, 2021

(86) PCT No.: PCT/EP2021/072438
§ 371 (c)(1),
(2) Date: Feb. 15, 2023

(87) PCT Pub. No.: WO2022/038022
PCT Pub. Date: Feb. 24, 2022

(65) Prior Publication Data
US 2024/0008964 A1 Jan. 11, 2024

(30) Foreign Application Priority Data
Aug. 17, 2020 (EP) .................... 20191329

(51) Int. Cl.
*A61C 17/02* (2006.01)
*A61C 17/22* (2006.01)
(52) U.S. Cl.
CPC ...... *A61C 17/0202* (2013.01); *A61C 17/0217* (2013.01); *A61C 17/221* (2013.01)

(58) Field of Classification Search
CPC .... A61C 17/02; A61C 17/0202; A61C 17/221
See application file for complete search history.

(56) References Cited

U.S. PATENT DOCUMENTS 3,593,962 A * 7/1971 Sullivan ............... A61C 17/032
251/343
10,420,630 B2 9/2019 Bergheim et al.
(Continued)

OTHER PUBLICATIONS

International Search Report and Written Opinion Dated Nov. 19, 2021 for International Application No. PCT/EP2021/072438 Filed Aug. 12, 2021.

*Primary Examiner* — Eric J Rosen
*Assistant Examiner* — Sydney J Pulvidente

(57) ABSTRACT

A system for oral irrigation comprises a fluid delivery tube with a proximal end and a distal end. The proximal end is configured to receive fluids for oral irrigation. The system also comprises a nozzle at the distal end of the fluid delivery tube with an aperture for fluid delivery. The nozzle is configured to at least partially obstruct the flow of fluid from the fluid delivery tube through the nozzle when the aperture is in contact with a tooth relative to when the aperture is away from said contact. A pump is configured to pump fluids through the fluid delivery tube based on a pump configuration and a sensor is used for sensing a pressure or flow rate in the fluid delivery tube. A controller is configured to detect whether the nozzle is in an interdental space based on the sensor detecting a pressure drop or a flow rate increase in the fluid delivery tube and adjust the pump configuration based on the nozzle being in an interdental space.

14 Claims, 15 Drawing Sheets

(56) References Cited

U.S. PATENT DOCUMENTS

| | | |
|---|---|---|
| 2009/0251687 A1 | 10/2009 | Duineveld et al. |
| 2011/0311939 A1 | 12/2011 | Hunter |
| 2012/0003601 A1 | 1/2012 | Hunter et al. |
| 2016/0331497 A1 | 11/2016 | Follows et al. |
| 2018/0221124 A1* | 8/2018 | Carlyle ................. A61C 15/00 |

* cited by examiner

ORAL IRRIGATOR WITH INTERDENTAL SPACE SENSING

This application is the U.S. National Phase application under 35 U.S.C. § 371 of International Application No. PCT/EP2021/072438, filed on Aug. 12, 2021, which claims the benefit of EP Application Serial No. 20191329.0, filed Aug. 17, 2020. These applications are hereby incorporated by reference herein.

FIELD OF THE INVENTION

The present invention relates to the field of oral irrigators. The invention further relates to combined brushing and oral irrigator devices.

BACKGROUND OF THE INVENTION

Oral hygiene consists of maintaining the hygiene of the occlusal surface of teeth and the sides of teeth. The occlusal surface is the surface of teeth used for chewing and/or grinding, and the sides of teeth are where the interdental spaces reside (i.e. spaces between teeth).

To facilitate proper oral cavity health, it is important to ensure that there is adequate cleaning of all dental surfaces, including the interdental space between teeth. Research has shown that improper cleaning of interdental spaces leads to gum and periodontal disease, and can lead to caries (i.e. class II cavities).

Dental practitioners (DPs) worldwide recommend their patients to clean between the teeth using various interdental cleaning methods or devices (such as floss, interdental brush, waterjet, etc.). Devices exist to help clean the interdental space with a jet of fluid. The force of the fluid jet removes the dental plaque.

Flossing devices are typically only effective at the interdental space. Flossing outside the interdental space has limited effectiveness and can lead to spillage of flossing fluid and undesired dispensing of liquid in the mouth.

Therefore, there is a need for a way to detect when a flossing device is in an interdental space.

SUMMARY OF THE INVENTION

The invention is defined by the independent claims. The dependent claims define advantageous embodiments.

According to examples in accordance with an aspect of the invention, there is provided a system for oral irrigation comprising:
  a fluid delivery tube with a proximal end and a distal end, wherein the proximal end is configured to receive fluids for oral irrigation;
  a nozzle at the distal end of the fluid delivery tube with an aperture for fluid delivery;
  a pump configured to pump fluids through the fluid delivery tube based on a pump configuration;
  a sensor for sensing a pressure or flow rate in the fluid delivery tube; and
  a controller configured to:
    detect whether the nozzle is in an interdental space based on the sensor detecting a pressure drop or a flow rate increase in the fluid delivery tube; and
    adjust the pump configuration based on the nozzle being in an interdental space.

The flow of fluid from the fluid delivery tube through the nozzle is at least partly obstructed when the aperture is in contact with a tooth relative to when the aperture is away from said contact. This enables detection of an interdental space.

When using the system for oral irrigation, the nozzle will at times be in contact with the teeth. When the nozzle is in contact with a tooth, the aperture of the nozzle will be, at least, partially obstructed. This causes the pressure of the first fluid in the fluid delivery tube to stay at a relatively constant (high) pressure. However, when the nozzle is moved to an interdental space, the aperture is no longer in contact with a tooth, and as such the pressure in the fluid delivery tube decreases and/or the flow rate in the fluid delivery tube increases. This decrease in pressure and/or increase in flow rate signals to a controller that the nozzle is now in an interdental space.

Oral irrigation is most efficient in the interdental spaces. Thus, when the controller is signaled (by a decrease in pressure) that the nozzle is in an interdental space, it can adjust the pump configuration to deliver an appropriate cleaning of the interdental space.

The pump configuration could be the current, voltage, duty cycle, or any other operating parameter of a pump which allows to change the pressure and/or flow rate of the fluid being pumped. The pump configuration may additionally or alternatively relate to the fluid being pumped, for example by controlling the connections between one or more fluid sources and the pump. For example, once an interdental space is detected, a special type of fluid (like fluoride, anti-bacterial) may be delivered (with the same or different pump drive settings).

For example, the system could be pumping water at a low flow rate before the controller has detected an interdental space. Once an interdental space has been detected, the pump parameters could be changed (e.g. voltage increase) such that the water is pumped at a high flow rate (relative to the previous flow rate) which is appropriate to remove biofilm from the interdental space without damaging the gums.

Alternatively, the system could be pumping air for sensing an interdental space and change to pumping water or oral flossing liquid when the controller detects an interdental space. The fluids used for the interdental cleaning and for the sensing of the interdental space include air, water, mouthwash, fluoride based fluid etc.

An oral irrigator may also be known as a dental water flosser, a dental water jet or as a water toothpick.

Adjusting the pump configuration may comprise controlling the pump to pump a first fluid at a first flow rate through the fluid delivery tube based on the controller detecting the nozzle is not in an interdental space and controlling the pump to pump a second fluid at a second flow rate through the fluid delivery tube based on the controller detecting the nozzle is in an interdental space.

A fluid reservoir may be used for providing the first fluid and/or the second fluid.

The first and second fluids may be the same fluid. However, the first fluid may be a gas (e.g. air) and the second fluid may be liquid. During oral irrigation, the nozzle will spend a significant amount of time in contact with a tooth and not in an interdental space. If, for example, the first fluid and second fluid are both the same liquid, a large amount of liquid will be delivered to the mouth of the user whilst only a small percentage will be at the interdental spaces. This would cause a waste of the liquid and would cause an excess of liquid to be delivered to the mouth of the user, which can become uncomfortable.

Thus, the use of a gas, such as air, as the first fluid reduces the amount of liquid stored in the mouth of the user as well as reducing the amount of liquid not used at the interdental spaces.

One or more air inlets may be used for providing the first fluid.

The system may further comprise a switch, wherein the controller is configured to activate the switch based on detecting a pressure drop and/or an increase in flow rate and wherein activating the switch causes the pump to change the fluid flowing through the fluid delivery tube to change from the first fluid to the second fluid.

The pump may be a pulsatile irrigation pump.

The nozzle may be manufactured from a conformable material.

Manufacturing a nozzle from a conformable material allows the area of the aperture of the nozzle to be reduced when a force is applied to the nozzle and thus deforming it. When the nozzle is pushed against a tooth, the nozzle will deform, reducing the area of the aperture and thus reducing the flow rate and increasing the pressure of the fluid in the fluid delivery tube.

The nozzle may comprise a mechanical spring-loaded valve at the end of the nozzle. This adjusts the pressure according to the contact with the tooth surface.

The aperture of the nozzle may be configured such that the fluid is ejected from the nozzle in a direction which deviates from the direction of the nozzle.

By directing the fluid in a direction which deviates from the direction of the nozzle, a larger surface area of the interdental space can be covered by the ejected fluid, thus enabling an improved oral flossing for the interdental space.

The direction of the fluid ejected from the nozzle may change with respect to time, wherein the change in direction is towards the direction of the nozzle.

For example, the fluid can be ejected with a larger lateral velocity component at first, reducing the lateral component with time such that eventually the deeper parts of the interdental space are also covered the ejected fluid.

The controller may be further configured to control the pump to return to pumping the first fluid at the first flow rate through the fluid delivery tube after the pump has pumped the second fluid at the second flow rate through the fluid delivery system for a predetermined time period.

Thus, the pumping at the second flow rate may have a fixed duration, corresponding to an expected dwell time during which the interdental space is cleaned. Thus, the device may return to a sensing mode (waiting for the next interdental space to be detected) once the time for cleaning of one interdental space has passed.

The controller may be further configured to control the pump to pump the first fluid at a first flow rate through the fluid delivery tube after pumping the second fluid at the second flow rate through the fluid delivery system and the sensor detecting a pressure increase or a flow rate decrease in the fluid delivery tube.

In this case, the end of interdental cleaning is detected based on a pressure increase. This may be used for triggering the end of the interdental dwell time instead of the fixed time duration, or it may be used to detect premature movement from the interdental space even if there is a fixed expected dwell time.

The system may further comprise a toothbrush head comprising a plurality of protruding bristles, wherein toothbrush head further comprises the nozzle.

Thus, the oral irrigation system defined above may be combined with and incorporated into a toothbrush head.

The present invention also provides a method for controlling an oral irrigation system, the method comprising:
controlling a pump to pump fluids through a fluid delivery tube based on a pump configuration;
detecting a pressure and/or a flow rate in the fluid delivery tube; and
detecting whether the oral irrigation system is in an interdental space based on detecting a pressure drop or a flow rate increase in the fluid delivery tube; and
adjusting the pump configuration based on the oral irrigation system being in an interdental space.

The method is implemented in software. The invention thus also provides a computer program comprising computer program code which, when executed by a processor, causes the processing system to perform all of the steps of the method. The invention also provides a processor having stored thereon on the computer program.

The invention also provides a handle of an oral irrigation system, wherein the handle comprises:
an interface for connecting the handle to an oral irrigation head;
a fluid delivery tube for delivering fluid to the oral irrigation head;
a pump configured to pump fluids to the fluid delivery tube (102) based on a pump configuration; and
the processor defined above for controlling the pump.

Other heads may also be attached to the handle, such as combined toothbrush and oral irrigation heads.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
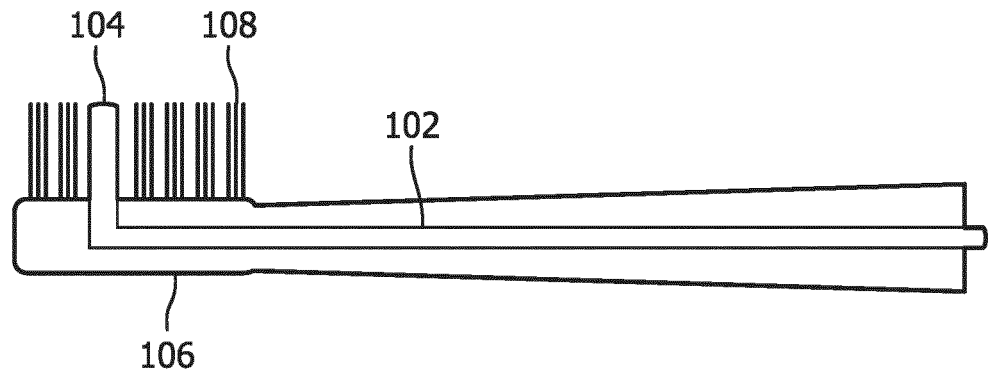
FIG. 1 shows a schematic of the head section of a toothbrush.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a system for oral irrigation. The system comprises a fluid delivery tube with a proximal end and a distal end. The proximal end is configured to receive fluids for oral irrigation. The system also comprises a nozzle at the distal end of the fluid delivery tube with an aperture for fluid delivery. The nozzle is configured to at least partially obstruct the flow of fluid from the fluid delivery tube through the nozzle when the aperture is in contact with a tooth relative to when the aperture is away from said contact. A pump is configured to pump fluids through the fluid delivery tube based on a pump configuration and a sensor is used for sensing a pressure or flow rate in the fluid delivery tube. A controller is configured to detect whether the nozzle is in an interdental space based on the sensor detecting a pressure drop or a flow rate increase in the fluid delivery tube and adjust the pump configuration based on the nozzle being in an interdental space.

FIG. 1 shows a schematic of the head section 106 of a toothbrush. A fluid delivery tube 102 with a nozzle 104 at the distal end is incorporated to the toothbrush head 106. The nozzle 102 protrudes from the head section 106 in the same (or largely the same) direction as the bristles 108 of the toothbrush.

The fluid delivery tube 102 and the nozzle 104 can be used for oral flossing. FIG. 1 shows a combined oral flossing and brushing system. The proximal end of the fluid delivery tube 102 can be connected to a pump and a fluid reservoir for oral flossing. Additionally, a pressure sensor may be connected to the fluid delivery tube to measure the pressure inside the fluid delivery tube.

Figure 2:
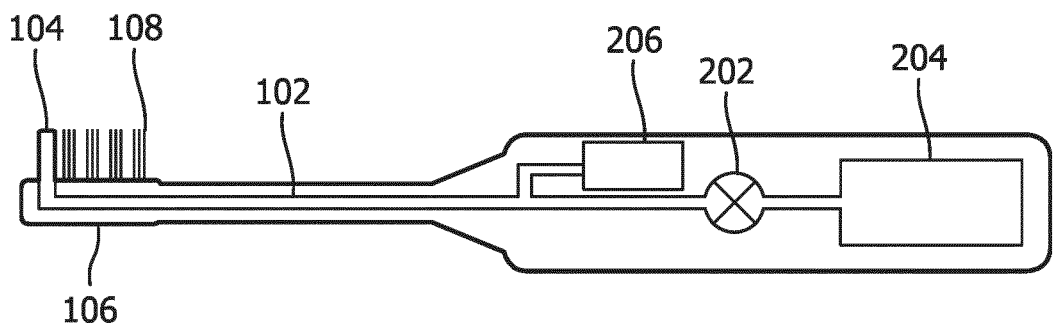
FIG. 2 shows a schematic representation of a toothbrush with an oral irrigator.

FIG. 2 shows a schematic representation of a toothbrush with an oral irrigator. The toothbrush comprises a fluid delivery tube 102 with a nozzle 104 at the distal end, a pump 202 connected to the fluid delivery tube 102, a fluid reservoir 204 to store the fluid to be pumped and a sensor 206 for measuring the pressure and/or the flow rate inside the fluid delivery tube 102. The toothbrush also has a head section 106 which houses the bristles 108 of the toothbrush and the nozzle 102 of the fluid delivery tube 102.

In this example, the fluid reservoir 204, pump 202 and sensor 206 are part of the toothbrush. However, these components may be separate to the toothbrush and connected by the fluid delivery tube 102. Additionally, the fluid delivery tube 102 and the nozzle 104 may be independent (not part of a toothbrush) and form part of an oral irrigation system.

Additionally, in this example, the sensor 206 will be described as a pressure sensor. However, the sensor 206 could also be a flow sensor or a combined sensor which can measure flow rate and pressure inside the fluid delivery tube.

A decrease in pressure in the fluid delivery tube 102 can be used to indicate that the nozzle 104 has reached an interdental space when brushing teeth or performing an oral irrigation. In the example of FIG. 2, the oral irrigation system is a component of a combined brushing and flossing toothbrush. The components of the oral irrigation system include a fluid delivery tube 102 with a nozzle 104 at the distal end of the fluid delivery tube 102 and an aperture at the nozzle 104. When the oral irrigation system is a component of a combined brushing and flossing toothbrush as shown, the aperture of the nozzle 104 may be in the vicinity of the bristles 108 of the toothbrush.

The pump 202 is used to drive a fluid through the fluid delivery tube 102 from the fluid reservoir 204. The pressure sensor 206 is used to determine directly, or indirectly, the flow of fluid and/or the pressure of the fluid through the fluid delivery tube 102.

The pressure sensor 206 is used for sensing a drop in pressure to indicate an interdental space. For example, the nozzle 104 may have a conformable aperture at the point of contact with the tooth. The conformable nature of the nozzle 104 enables a substantial blocking of the fluid flow when there is contact with the hard surface of the tooth. The substantial blocking causes a build-up of pressure in the fluid delivery tube 102, which can be registered in the pressure sensor 206. Alternatively, a nozzle 104 with a mechanically modified aperture (e.g. spring loaded), which is only opened by breaking contacting with a hard surface (e.g. leaving the hard tooth into the interdental space), can be used.

The fluid used for sensing an interdental space may be a liquid. For example, the liquid which is used for sensing may be the same liquid as used for jetting, flossing and/or oral irrigation. The drop in pressure in the fluid delivery tube 102 may then trigger an interdental cleaning process, for example comprising an increase in flow rate.

The fluid delivery tube 102 can be used for both interdental cleaning and the sensing of a pressure decrease. A low flow rate of the fluid can be used during the sensing of an interdental space and a high flow rate can then be used for the interdental cleaning process. In this manner, the fluid is more efficiently used and the user does not have to deal with excessive amounts of liquid in their mouth.

The pressure sensor 206 in combination with the nozzle 104 (at least) partially blocking when in contact with teeth can be used for robust and reliable detection of the interdental space. These functions can be integrated in a brush head or device with an oral flossing function. The oral flossing function can selectively be switched on at the interdental space (i.e. when an interdental space is detected), thus saving flossing fluid and preventing ineffective flossing outside the interdental space.

In this example, there is only one fluid reservoir 204 and the fluid used for detecting an interdental space is the same as the fluid used for oral irrigation/flossing function. However, it is possible to use a first fluid for detecting an interdental space and a second fluid for cleaning the interdental space. There may also be a first fluid reservoir for the first fluid and a second fluid reservoir for the second fluid.

Figure 3:
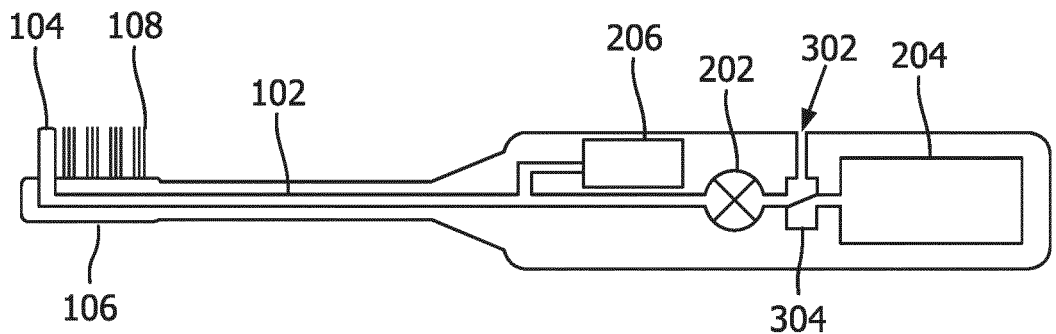
FIG. 3 shows a schematic representation of a toothbrush with an oral irrigator and an air inlet.

FIG. 3 shows a schematic representation of a toothbrush with an oral irrigator and an air inlet 302. The toothbrush has an air inlet 302 as well as a switch 304 between the fluid reservoir 204 and the air inlet 302. The switch 304 is configured such that the pump 202 can pump either air or a fluid through the fluid delivery tube 102. Alternatively, a second fluid reservoir with air (or any gas) may be used instead of the air inlet 302. One or more air inlets 302 may also be used, to ensure that if any of the air inlets 302 is blocked by the hand of the user, the pump 202 can still pump air.

The pump 202 provides a gas flow through the fluid delivery tube 102 and the nozzle 104 for detecting an interdental space and provides a liquid burst or flow for the interdental cleaning. In this manner the jetting liquid is more efficiently used. Thus, a combination of a gas flow, to identify the interdental area, and a liquid flow, to carry out the interdental cleaning, is used. In this manner, there is no unwanted loss of cleaning fluid into the user's mouth. In this example, the pump 202 is modified to sequentially pump either a gas or a liquid using the switch 304 between the liquid reservoir 204 and a source of gas, for example a second reservoir or the air inlet 302.

A controller can be used to control the pump 202 to pump a first fluid (e.g. air) when the pressure sensor 206 has not detected a decrease in the pressure in the fluid delivery tube 102 (i.e. the nozzle 104 is contact with a tooth) and pump a second fluid (e.g. cleaning fluid) when the pressure sensor 206 detects a decrease in pressure in the fluid delivery tube 102 (i.e. when the nozzle is in an interdental space).

Figure 4:
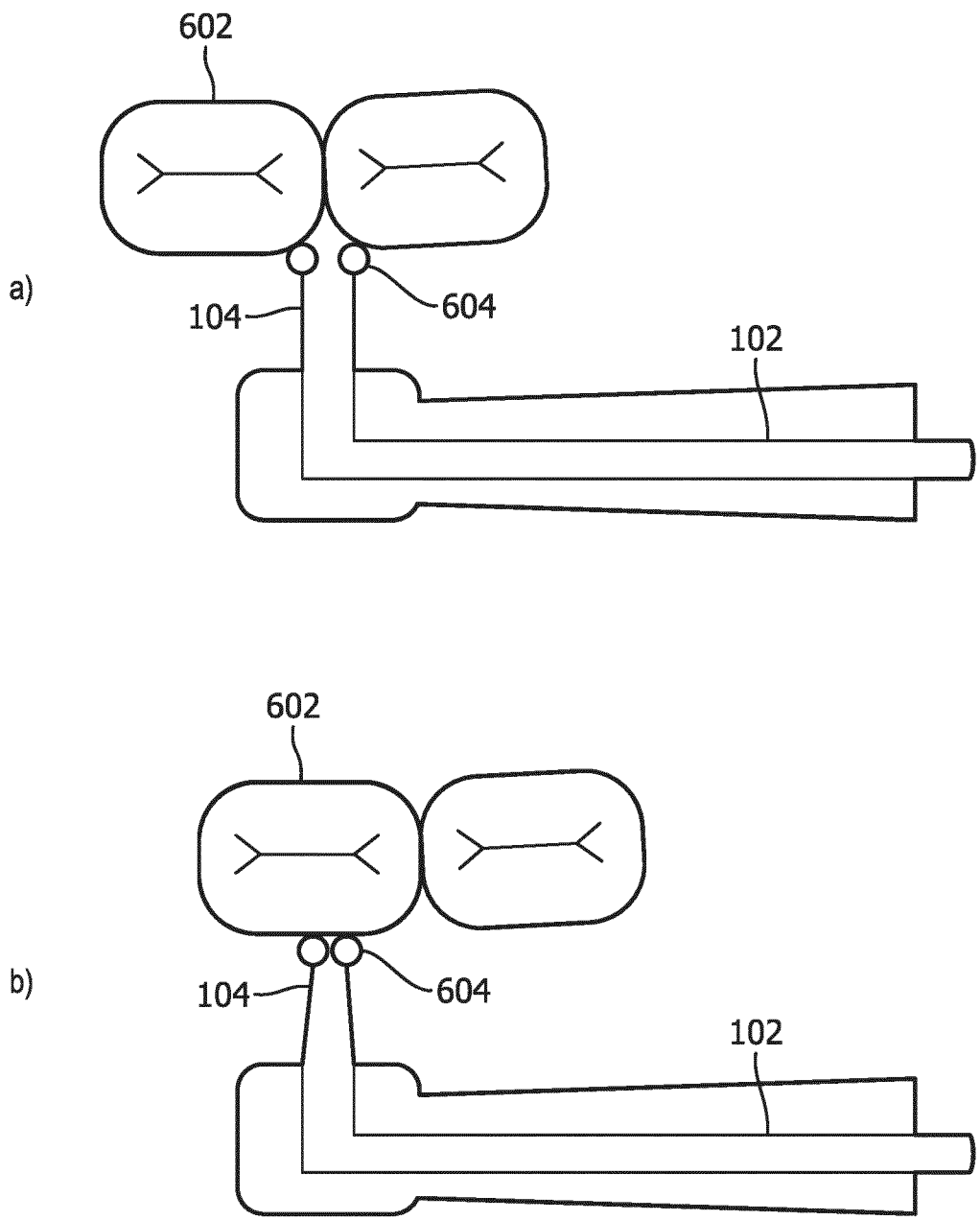
FIG. 4 shows a first example of a nozzle design.

FIG. 4 shows a first example of a nozzle 104 design. FIG. 4 a) shows the nozzle 104 when it is in an interdental space and the nozzle 104 aperture is open. FIG. 4 b) shows the nozzle 104 when it is in contact with a tooth 602 and the nozzle 104 aperture is closed or partially closed.

In this example, the end of the nozzle 104 is made of a conformable material 604. The material 604 has the property that when the nozzle 104 makes contact with a hard surface (such as the tooth 602), the material 604 partially flattens against the hard surface and as such enables a substantial blocking of the nozzle 104 aperture on the hard surface of the tooth 602. Suitable conformable materials 604 are soft, elastic materials such as silicones, rubbers etc. The substantial blocking causes a build-up of pressure in the fluid delivery tube 102, which can be registered by the pressure sensor 206.

In this example, the aperture of the nozzle 104 will also stay open when the nozzle 104 is not in contact with the user's teeth 602. For example, at the start or end of the brushing/flossing period or when the nozzle 104 moves for example from the top to bottom jaw, the nozzle 104 will not be in contact with the user's teeth 602. For this reason, there is a risk that there will be unwanted spraying of the cleaning fluid into the mouth as the nozzle 104 loses contact with the teeth 602. In order to reduce such an effect, the flow of liquid during the interdental sensing may be much lower than that used during the cleaning process.

Furthermore, it may be advantageous only to initiate a cleaning cycle after the pressure sensor 206 senses a drop in pressure (and not just that the pressure is low). In this manner unwanted release of cleaning fluid can be avoided before the nozzle touches the teeth 602.

When the conformable material 604 breaks contact with a tooth 602 (for example to enter the interdental space) the nozzle 104 unblocks, the pressure decreases rapidly and the pressure senor 206 can interpret that the nozzle 104 is an interdental space. At this point the interdental cleaning cycle can be initiated—which may consist of a relatively high flow of cleaning liquid or a series of bursts of the cleaning liquid. The duration of the interdental cleaning cycle may be a (fixed) short time to avoid unwanted fluid release. As the nozzle 104 moves onto the next tooth 602, there will be a rapid increase of pressure in the fluid delivery tube 102, which can be interpreted as the nozzle 104 leaving the interdental space and thus the cleaning cycle can be stopped, if it has not yet been completed. In such a manner, the pressure sensor 206 may also ensure that if the nozzle 104 passes more quickly across the interdental space than would be required to implement the fixed cleaning cycle, this cycle can be terminated prematurely to save wastage of cleaning fluid.

For example, once the pressure has (rapidly) increased, the pressure sensor may return back to a "sensing mode" (sensing an interdental space e.g. with a first fluid at a lower flow rate) and remain in this mode until the following interdental space is entered.

Note that these system configurations (of different flow rates, of detection of pressure drops, and stopping the cleaning cycle if there is movement from the interdental space prematurely) may be applied to each of the nozzle designs described below.

Figure 5:
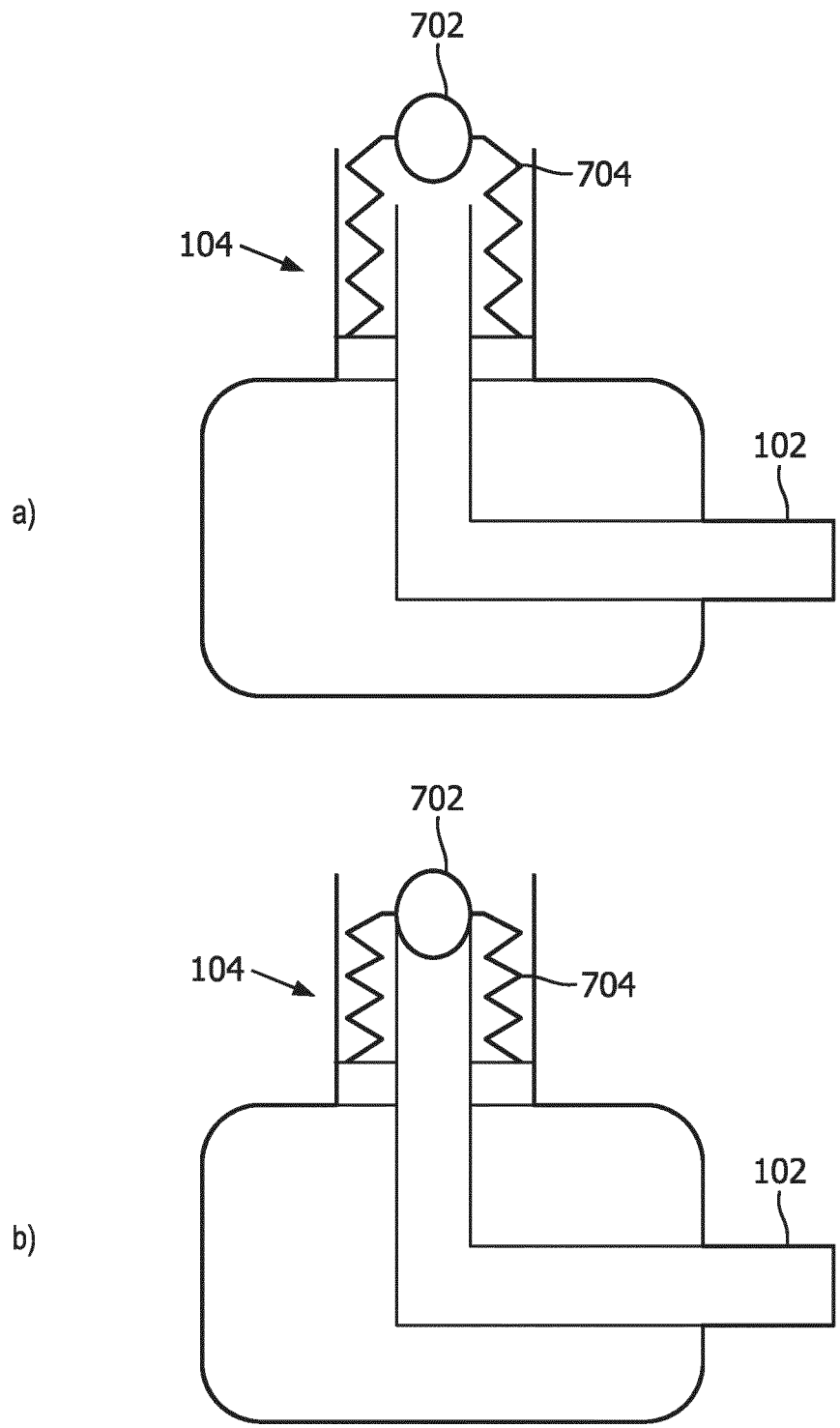
FIG. 5 shows a second example of a nozzle design.

FIG. 5 shows a second example of a nozzle 104 design. FIG. 5 a) shows the nozzle 104 when the nozzle 104 aperture is open, i.e. flow can be delivered through the fluid delivery tube. FIG. 5 b) shows the nozzle 104 when the nozzle 104 aperture is closed or partially closed, so that flow through the delivery tube is blocked or partially blocked.

In this example, the nozzle 104 incorporates a mechanically modified, spring loaded, aperture. The aperture comprises a ball shaped stopper 702 which is spring loaded with a spring 704 to be in an opened position when not in contact with a hard surface (e.g. no forces applied to the stopper 702). The aperture has the property that when the nozzle 104 makes contact with a hard surface (such as the tooth 602), the stopper 702 is pushed towards the aperture of the nozzle 104 and as such enables a substantial blocking of the nozzle aperture when pressed against the hard surface of the tooth 602. The substantial blocking causes a build-up of pressure in the fluid delivery tube 102, which can be detected by the pressure sensor 206 in the same manner as explained above.

The stopper 702 may be further designed to cause the cleaning liquid to deviate from the usual direction (in line with the axis of the tube). This can be advantageous for directing the fluid to more of the interdental surface of the teeth 602. The spring 704 may also be configured such that the opening and/or the closing of the stopper 702 is implemented relatively slowly (e.g. with a time period of around half the dwell time of the nozzle 104 in the interdental region). In this manner, the cleaning fluid will firstly be sprayed more in the lateral direction, being then directed more in the axial direction of the nozzle 104 as the stopper 702 is fully opened. In this manner, the cleaning fluid will dynamically spray firstly the shallower areas and then the deeper parts of the interdental spaces. Thus, the stopper may act both as a valve closure and as a flow directing element, so that the flow varies in dependence on the valve state between fully opened and fully closed.

The nozzle 104 aperture may be designed to close off on the teeth 602 sufficiently when the brush is held at 45 degrees or more relative to the plane of the teeth 602.

For example, the nozzle 104 may need to be slightly longer than the toothbrush bristles (in a combined oral irrigation and toothbrush device) to still touch the teeth 602 when angulated and consist of a flexible tube which is still comfortable when the toothbrush/nozzle 104 is at 90 deg. For example, a bigger ball than illustrated in FIG. 5 could accommodate for more angles.

It may be appreciated that different designs can be used to block the flow of fluid when there is contact with the teeth 602 (high pressure sensed), and release the flow without contact, i.e. in the interdental spaces.

Figure 6:
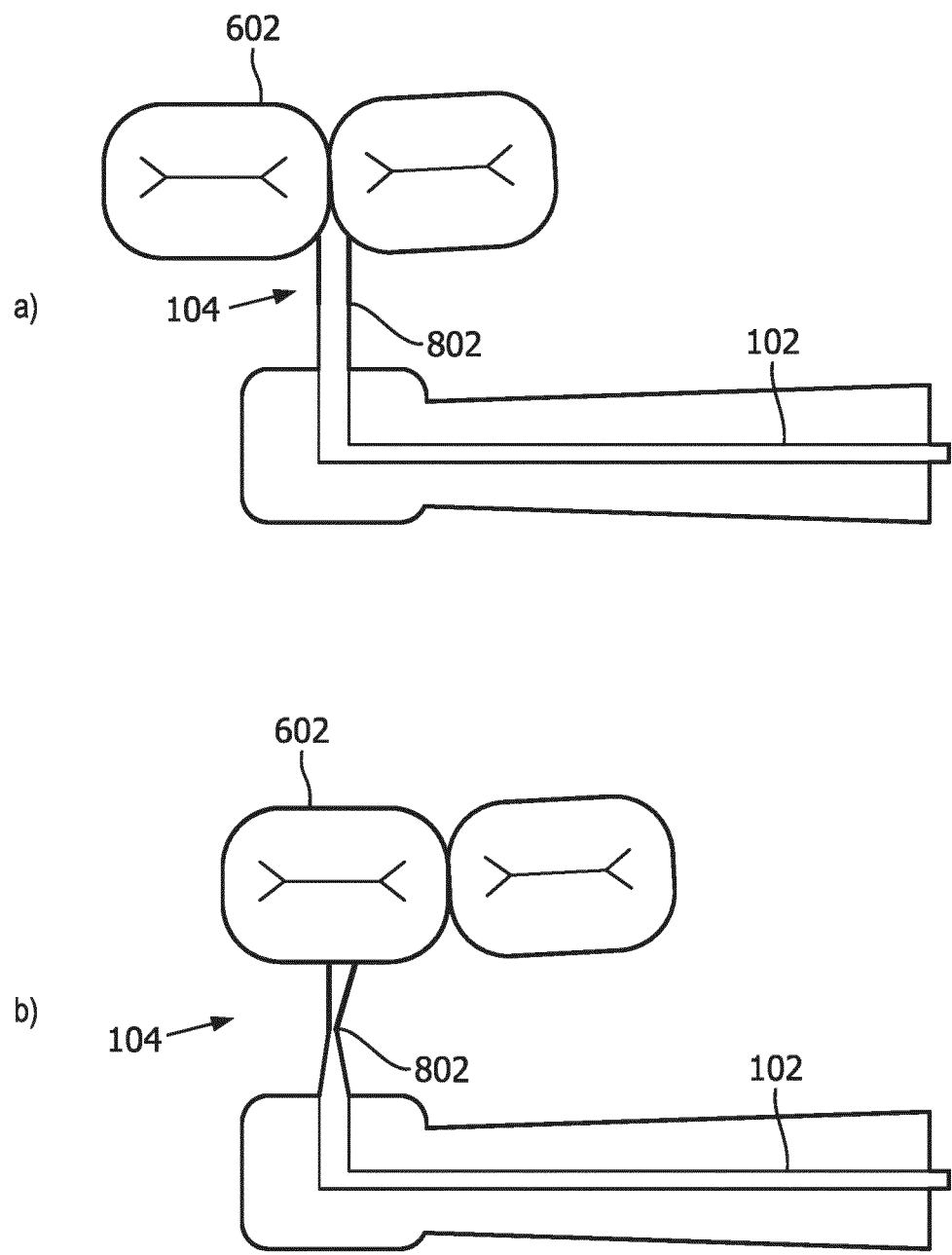
FIG. 6 shows a third example of a nozzle design.

FIG. 6 shows a third example of a nozzle 104 design. FIG. 6 *a*) shows the nozzle 104 when it is in an interdental space and the nozzle 104 aperture is open. FIG. 6 *b*) shows the nozzle 104 when it is in contact with a tooth 602 and the nozzle 104 aperture is closed or partially closed.

In this example, the nozzle 104 has a kink 802 which closes/restricts the flow of fluid through the nozzle 104 upon contact with a tooth 602. When the nozzle 104 is forced against a tooth 602, the force from the tooth 602 causes the kink 802 to bend inwards, thus reducing the area of the aperture of the nozzle 104 and restricting fluid flow from the nozzle 104. This increases the pressure inside the fluid delivery tube 102, which can be measured by the pressure sensor 206 connected to the fluid delivery tube 102.

Figure 7:
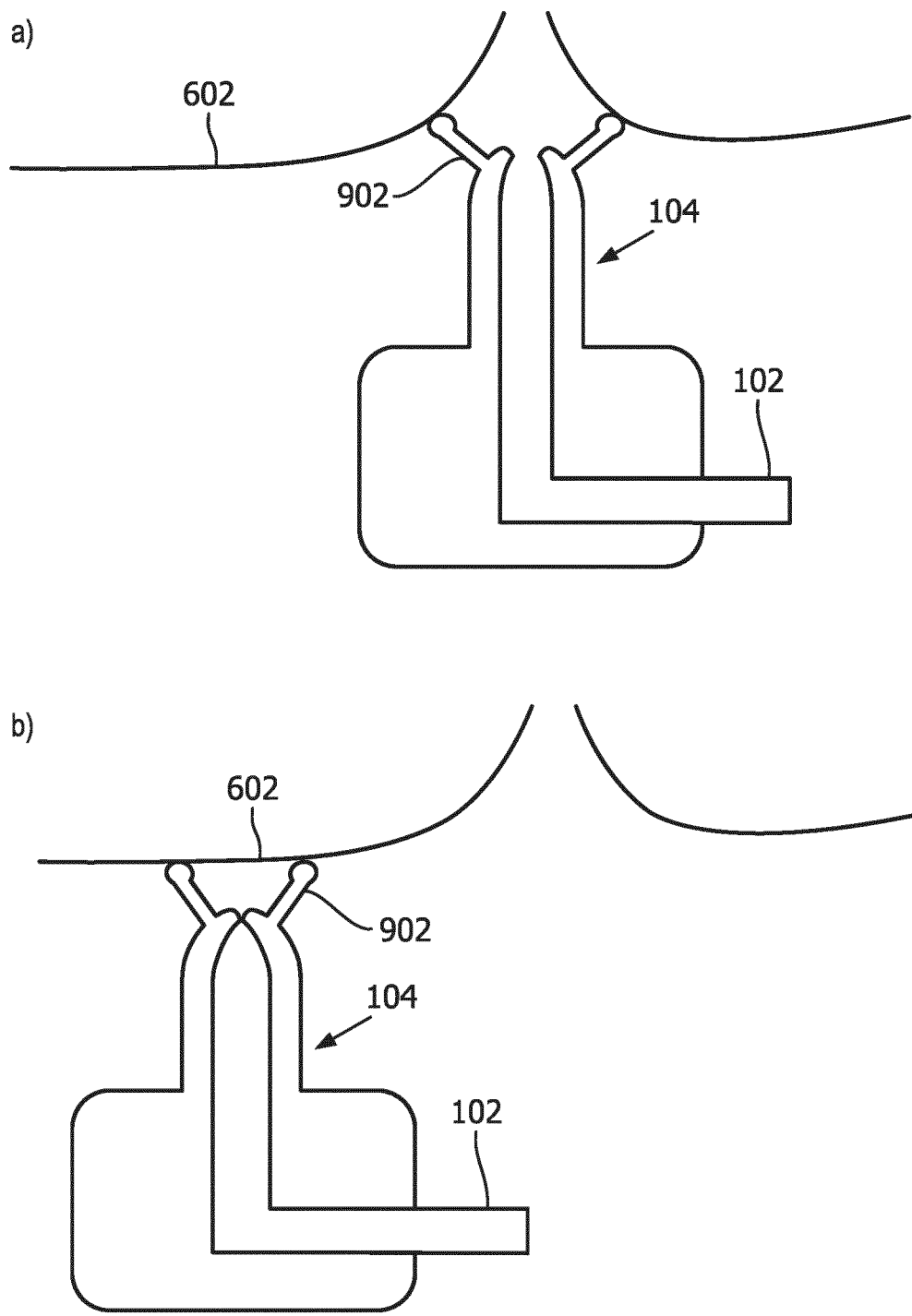
FIG. 7 shows a fourth example of a nozzle design.

FIG. 7 shows a fourth example of a nozzle 104 design. FIG. 7 *a*) shows the nozzle 104 when it is in an interdental space and the nozzle 104 aperture is open. FIG. 7 *b*) shows the nozzle 104 when it is in contact with a tooth 602 and the nozzle 104 aperture is closed or partially closed.

In this example, the aperture of the nozzle 104 has a flat duckbill-like aperture that is flexible. Two legs 902 push the aperture closed when on the teeth 602, but open between the teeth 602 (at the interdental space) as the legs 902 can flex away. An advantage of this design may be that the nozzle 104 aperture can be extended from the teeth 602 to have more space for the fluid jet to develop for interdental cleaning.

Figure 8:
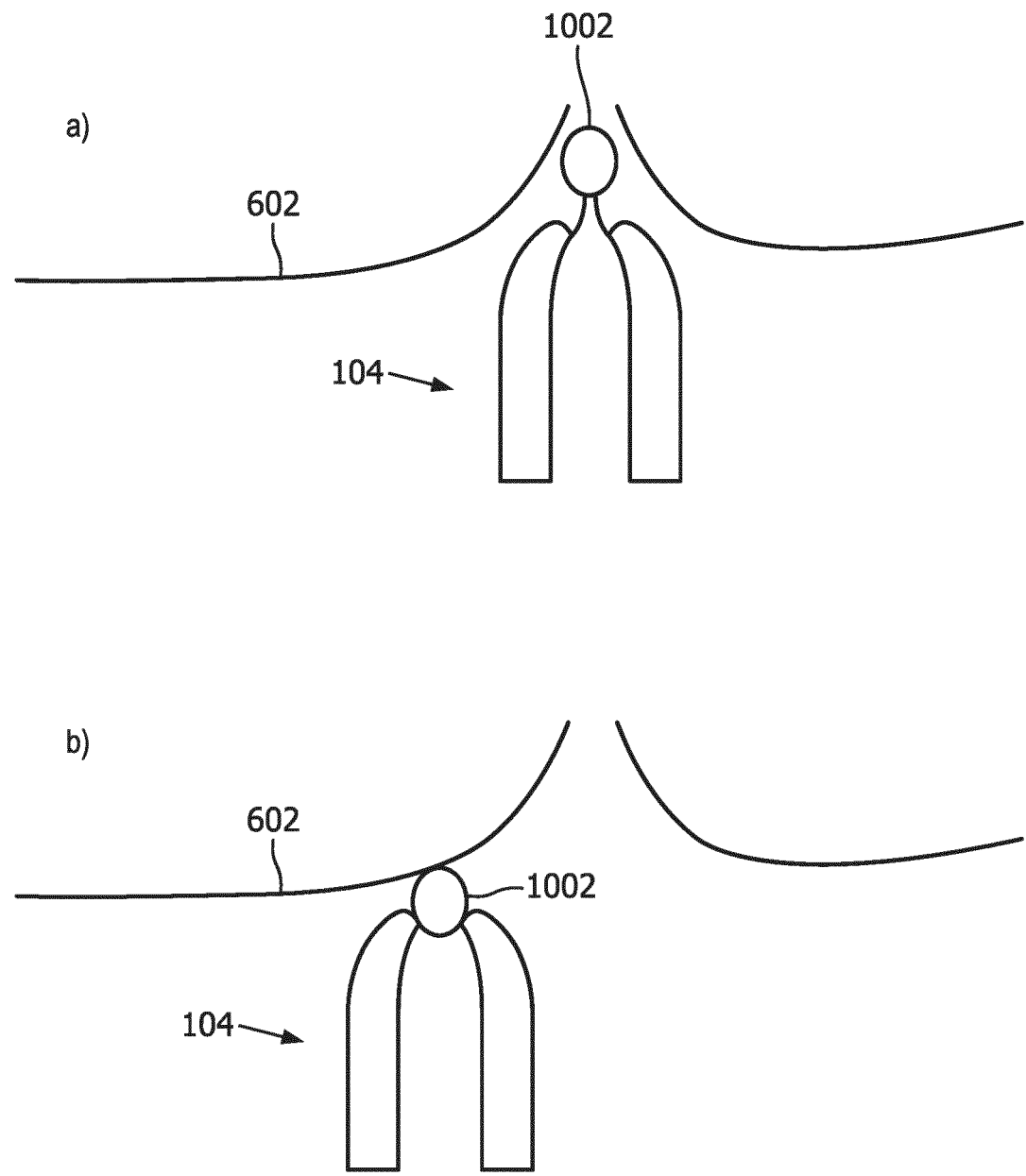
FIG. 8 shows a fifth example of a nozzle design.

FIG. 8 shows a fifth example of a nozzle 104 design. FIG. 8 *a*) shows the nozzle 104 when it is in an interdental space and the nozzle 104 aperture is open. FIG. 8 *b*) shows the nozzle 104 when it is in contact with a tooth 602 and the nozzle 104 aperture is closed or partially closed.

In this example, a ball-like stopper 1002 is placed in the aperture of the nozzle 104. In the interdental space, the stopper 1002 is pushed away by the pressure of the flow of fluid. When the stopper 1002 is in contact with a tooth 602, the tooth 602 stops the stopper 1002 from being pushed away and thus reduces the flow of liquid. The stopper 1002 can be attached to the nozzle 104 by a holding mechanism (e.g. string, spring etc.).

Figure 9:
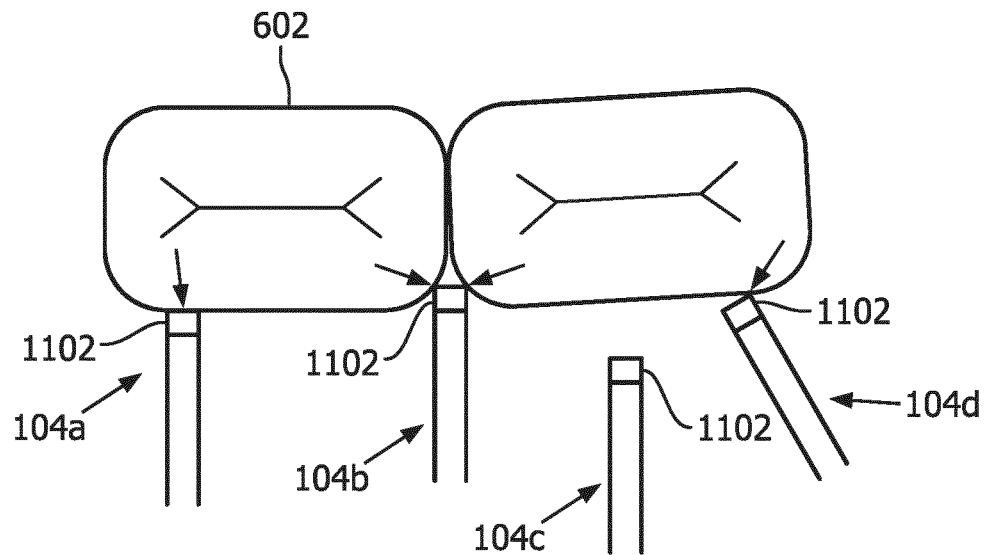
FIG. 9 shows a nozzle with a mechanical valve in different states.

FIG. 9 shows a nozzle 104 with a mechanical valve 1102 in different states. Four nozzles 104*a*, 104*b*, 104*c* and 104*d* are shown. The first nozzle 104*a* is in contact with a single tooth 602 and thus only has one force (from the tooth) applied to it. The second nozzle 104*b* is in an interdental space and thus has two forces applied to it (from both neighboring teeth at each side of the interdental space). The third nozzle 104*c* is in the air and not in contact with any teeth 602, thus there is no forces applied to it. The fourth nozzle 104*d* is in contact with one tooth 602 at an angle, and has one force from the tooth 602 dependent on the angle.

Flossing devices are typically only effective at the interdental spaces. Flossing outside the interdental space has limited effectiveness and can lead to spillage of flossing fluid and undesired dispense of liquid in the mouth. This is particularly a problem with combination devices integrating flossing and brushing functions, as for maneuvering the combined device easily an untethered design is desirable, but also the device size is limited, leaving only limited space for a fluid reservoir. Additionally, the fluid can dilute fluoride in the toothpaste, potentially reducing the efficacy of the anti-caries protection of fluoride.

This example makes use of the anatomy difference at the interdental space, where two adjacent teeth 602 form a narrowing channel. The mechanical valve 1102 closes the aperture of the nozzle 104 at the normal peak pressure of an interdental cleaning jet. This may, for example, be a high crack pressure duckbill valve. This means, that fluid can be prevented from flowing automatically when the nozzle is in free space or when against a tooth. Thus, the interdental space geometry is used to open the valve which would otherwise be closed, rather that the tooth surface closing a valve which would otherwise be open (as in the examples above).

When the mechanical valve 1102 is pushed in the interdental space, two opposing teeth 602 push against the two opposite sides, releasing the mechanical valve and opening the nozzle 104 aperture at the jet peak pressure. Additionally, a controller may be used to record when the mechanical valve 1102 is open and closed based on the pump 202 characteristics. The peak pressure may for example be increased when the open state is detected. This may allow for a low pressure and low force closing mechanical valve 1102, which are typically more robust.

This example allows a low cost mechanical valve 1102 design, which only opens the nozzle 104 aperture when the mechanical valve 1102 is pushed in the interdental space anatomy. This allows an interdental cleaning jet to shoot only in the interdental space, thus there is no (or less) fluid spilling.

In some examples, the mechanical valve 1102 closes the nozzle 104 aperture at all times except when a force is applied from two sides (i.e. upon contact with the two opposing tooth surfaces of an interdental space). The mechanical valve 1102 will not open if there is no contact with teeth 602 (e.g. in the air) or if only one side of the mechanical valve 1102 is touching a tooth 602. In some further examples, the mechanical valve only opens due to two opposing radial forces (from opposite teeth 602).

For example, nozzle 104*a* (in FIG. 9) will only have one force from a single tooth 602, thus the mechanical valve 1102 will not open and there will not be any cleaning liquid jet. However, nozzle 104*b* is in the interdental space and is thus in contact with two neighboring teeth. This causes both teeth to apply a force each to the mechanical valve 1102. As there are two forces from neighboring teeth, the mechanical valve 1102 opens and a cleaning fluid jet can be allowed to pass through the nozzle 104*b* by the mechanical valve 1102 to clean the interdental space. In this example, the forces applied by the teeth 602 have a lateral component relative to the nozzle 104*b*. In some examples, the mechanical valve 1102 can be configured to only open when two lateral forces (force components) are applied to the mechanical valve 1102 at opposing sides of the mechanical valve 1102 (by the neighboring teeth at the interdental space).

Nozzle 104*c* is in the air and will thus have no forces applied by any teeth 602 and as such, the mechanical valve 1102 stays closed. The nozzle 104*d* has a force applied to it by a single tooth 602 with a lateral component (relative to the nozzle 104*d*). However, since there is only one force, the mechanical valve 1102 will not open for nozzle 104*d*.

Figure 10:
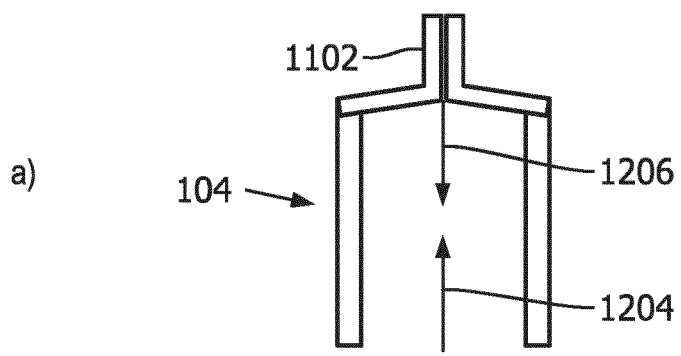
FIG. 10 shows in simplified schematic form the force balance on a mechanical valve.
Figure 10:
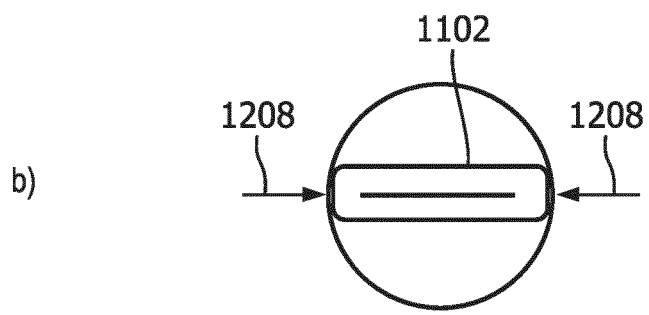

FIG. 10 shows in simplified schematic form the force balance on a mechanical valve 1102. FIG. 10 *a*) shows a cross section of a mechanical valve 1102 on a nozzle 104 and FIG. 10 *b*) shows atop down view of the mechanical valve 1102. A duckbill-like valve has been illustrated in FIG. 10, however the force balance shown in FIG. 10 applies to other examples of a mechanical valve 1102.

A general characteristic of a mechanical valve 1102 is its crack pressure (CP), i.e. the pressure at which the mechanical valve 1102 opens due to the liquid force becoming larger than the closing strength of the mechanical valve 1102. The CP of the mechanical valve 1102 is, in some examples, higher than the peak pressures in the nozzle 104, in order to keep the mechanical valve 1102 closed when in normal contact with the teeth 602 or when contacting only with one side. The mechanical valve 1102 is designed to reduce the CP when both sides are in the interdental space, and in touch with both teeth 602, due to the normal force with which the user presses an oral irrigator against the teeth 602. In this way, the mechanical valve 1102 opens at the peak pressure to release a cleaning burst.

Interdental cleaning can require liquid velocities of 25 to 50 m/s (liquid pressures of about 3 to 13 bar (300 kPa to 1.3 MPa)). A typical maximum pressure used in oral irrigators is 7 bar (700 kPa). Typical nozzle 104 aperture areas can range from 0.25 to 0.8 mm$^2$, with a typical value of 0.5 mm$^2$. The force against a mechanical valve 1102 of that size with 7 bar (700 kPa) would be 0.35 N. In order to robustly keep the valve closed, a 0.4 N closing force may be chosen for the mechanical valve 1102. In order to open robustly at the interdental space this force needs to drop to for example 0.3 N, so using a 0.1 N force working in the negative direction. Typical normal forces during brushing can be up to 2.5 N. This force will be divided over the bristles 108 and the nozzle 104, but by using a suitable mechanical design, 0.1 N of this force can be directed to an opening force of the mechanical valve 1102.

In FIG. 10, the pressure in the nozzle 104 will push to open the mechanical valve 1102 with a pressure driven force $F_p$ 1204 while a valve closing mechanism pushes the mechanical valve 1102 in the other direction with a closing force $F_c$ 1206. The mechanical valve 1102 can be designed such that $F_c=F_p$ (mechanical valve 1102 stays closed), but where the closing force $F_c$ 1206 is reduced when two sides of the nozzle 104 receive a pressing force 1208 due to the nozzle 104 being pushed in the interdental space by two neighboring teeth. The pressing force 1208 from the two neighboring teeth can be perpendicular and/or parallel to the direction of the nozzle. In this example, the pressing force 1208 is shown as being perpendicular to the direction of the nozzle 104, however, in some examples, the pressing force 1208 can be (partially) parallel to the direction of the nozzle 104.

From the internal nozzle 104 pressure P the total pressure driven force can be calculated $F_p$ P×A, where A is the mechanical valve 1102 area (in this example it is similar to the nozzle 104 aperture area). A pressure of 7 bar (700 kPa) gives for a 0.5 mm$^2$ mechanical valve 1102 a total force of 0.35 N.

In an example, the pressure behind the nozzle 104 may be constant when the nozzle 104 is closed. For example, the pump 202 may pump cleaning fluid into a hydraulic accumulator, keeping the pressure at, for example, 7 bar (700 kPa). When the mechanical valve 1102 opens, a single burst of liquid may be ejected, reducing the pressure which subsequently closes the nozzle 104. Such an oral irrigator may be efficient in the use of both cleaning fluid and power, since the cleaning fluid always comes out at a high velocity, wasting no energy and fluid in low velocity jetting which does not remove biofilm. Alternatively, the oral irrigator may also be driven by a more standard pulsatile irrigation pump. This may be used to give a number of bursts when the nozzle 104 stays positioned at the interdental space.

The example with the hydraulic accumulator may also fire a number of times, depending on how fast the accumulator is refilled after a burst. The pulsatile pump may use more energy, depending also whether the pump keeps pumping when the mechanical valve 1102 is closed. A controller may also be used to shut off or reduce the pumping power of the pump 202 when it senses there is no volume flow or no release of the pressure at the nozzle 104.

Figure 11:
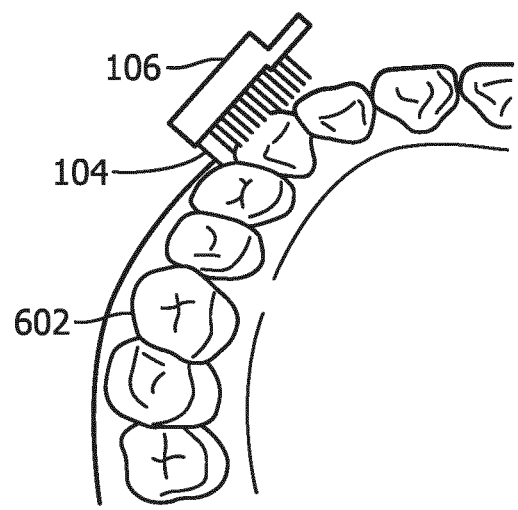
FIG. 11 shows the brush head of a combined brushing and flossing device when used on dentures.

FIG. 11 shows the brush head 106 of a combined brushing and flossing device in use. All interdental spaces have a narrowing gap, which will give a two sided force on an elongated body (i.e. nozzle 104) that is narrow enough to fit in the interdental space. In order to accommodate for different gap sizes, the tip of the nozzle 104 that is interacting with the two opposing teeth may be designed as a wedge shape. A wedge shaped nozzle 104 may be preferred to accommodate more interdental gap sizes. The nozzle 104 may need to project sufficiently beyond the bristles to experience a contact force with both sides of the interdental gap when the user presses the device against the teeth 602.

Figure 12:
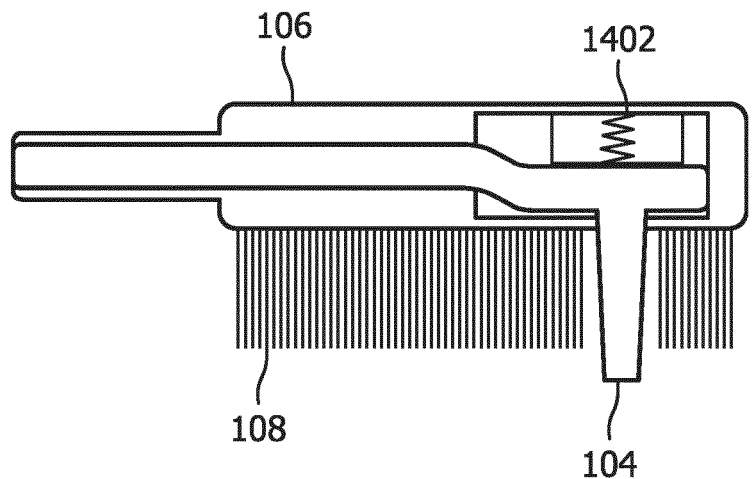
FIG. 12 shows the brush head of a combined brushing and flossing device with a spring loaded system.

FIG. 12 shows the brush head 106 of a combined brushing and flossing device with a spring loaded system 1402. In the combined toothbrush and oral irrigator, the nozzle 104 should project sufficiently that it will be pushed into the interdental space, but should not project so much it will impede brushing. In this example, the nozzle 104 may move independently in and out of the plane of the brush head 106, using a spring or other elastically controlled connection 1402 between the brush head 106 and the nozzle 104. This approach also enables a pushing force for the mechanical valve 1102 which is less dependent on the user's brushing force.

In this example, the nozzle 104 can move in and out of the bristle field using a spring loaded system 1402. This has the advantage that the mechanical valve 1102 can be designed to have sufficient force in the interdental space to open the nozzle 104 aperture and thus reduce the risk that the nozzle 104 impedes brushing when on the other surfaces.

A nozzle 104 having approximately the same length as the bristles 108 is however also possible since the bristles 108 typically have sufficient flexibility to adapt to the tooth contours. In typical toothbrush designs, there are different bristle lengths used to accommodate for all anatomies.

As mentioned above, the valve configuration may also be used as an interdental sensor. The fluid pressure in the fluid delivery tube 102 can then be low, so the mechanical valve 1102 can have a low crack pressure. Consequently, less pressing force 1208 from the two sides of the interdental space may be needed. This can make the mechanical valve 1102 more robust and more lenience on the design specifications can be given.

As the mechanical valve 1102 is typically closed, no flow or pressure drop will be sensed by the interdental sensor function until the mechanical valve 1102 is opened. The sensing may, for example, be based on a measurement of the power consumption or current drawn by the pump or it may be based on flow or pressure measurement.

For example, as soon as the mechanical valve 1102 opens in the interdental space, a flow increase or pressure drop in the fluid delivery tube 102 may be detected by, for example, a pressure sensor. The controller can respond by giving one or multiple bursts of cleaning fluid, for example, by increasing the pump 202 power.

The mechanical valve 1102 thus allows an oral irrigator to not use and hence not waste cleaning fluid when the nozzle 104 is not in contact with teeth 602 or when in contact with teeth 602 but not in the interdental space.

When power consumption is used as a sensing input, the pump may not completely be turned off. It could also run at a low pace, depending on the pump type. For example, the sensing mode will require some level of pressure to be maintained in front of the valve while the valve stays closed.

Figure 13:
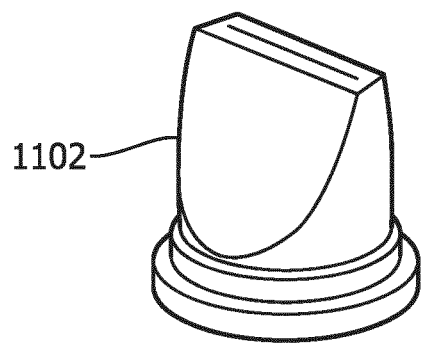
FIG. 13 shows a first example of a mechanical valve.
Figure 14:
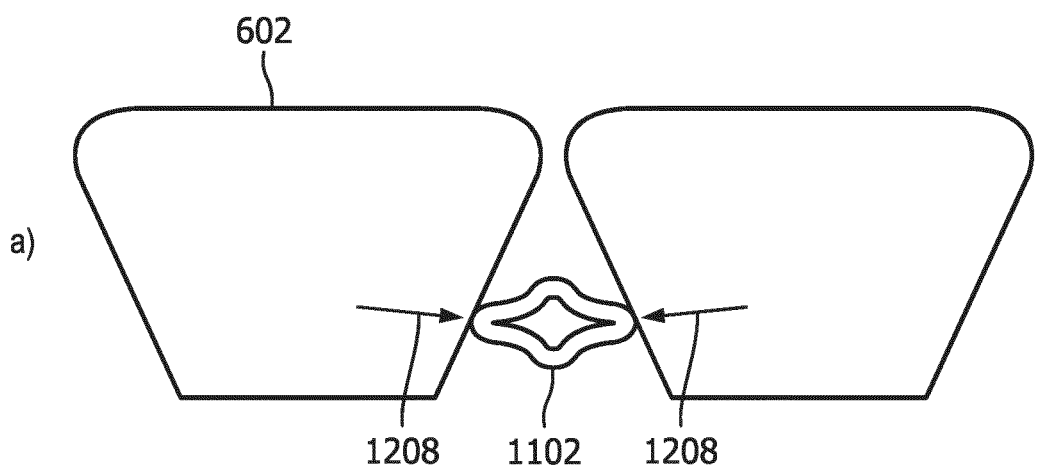
FIG. 14 shows a cross section of the second example of a mechanical valve.
Figure 14:
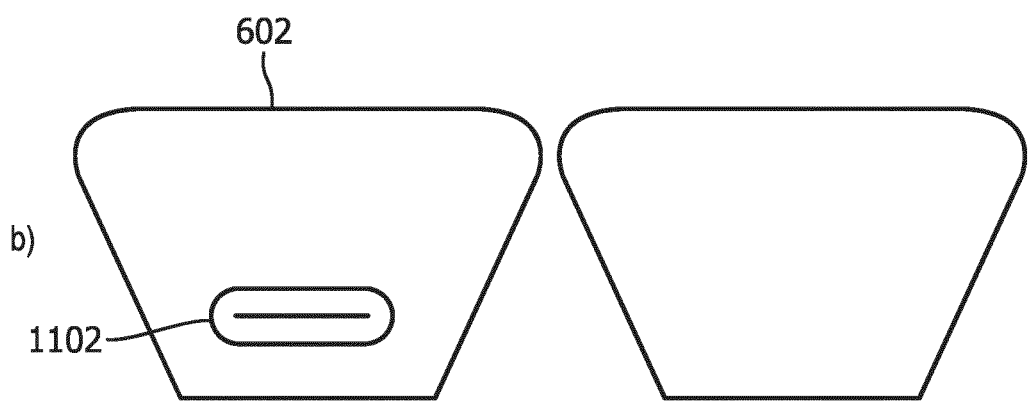

FIGS. 13 and 14 show a first example of a mechanical valve 1102 of the general type discussed with reference to FIG. 10. FIG. 13 shows a possible design for the mechanical valve 1102. FIG. 14 a) shows a cross section of the mechanical valve 1102 in an interdental space, wherein the mechanical valve 1102 is open. FIG. 14 b) shows a cross section of the mechanical valve 1102 in contact with a tooth 602, wherein the mechanical valve 1102 is closed.

A mechanical valve 1102 design requiring only a single part could be an elastomeric duckbill valve. If designed with an appropriate size, a duckbill valve will be pushed open by the two opposing tooth surfaces in an interdental space. Generally, duckbill valves are used to implement a mechanical valve 1102 with a low crack pressure. However, in some examples a high crack pressure valve needs to be designed to withstand the fluidic pressure when not pressed in the interdental space. The crack pressure of a duckbill design can be increased by using stiff elastomers or a relatively thick valve designs. An appropriately designed duckbill valve will not open at the peak pressures of the cleaning fluid, but can open at a combination of a sufficient internal peak pressure and a two-sided pressing force 1208 at the interdental space position.

Figure 15:
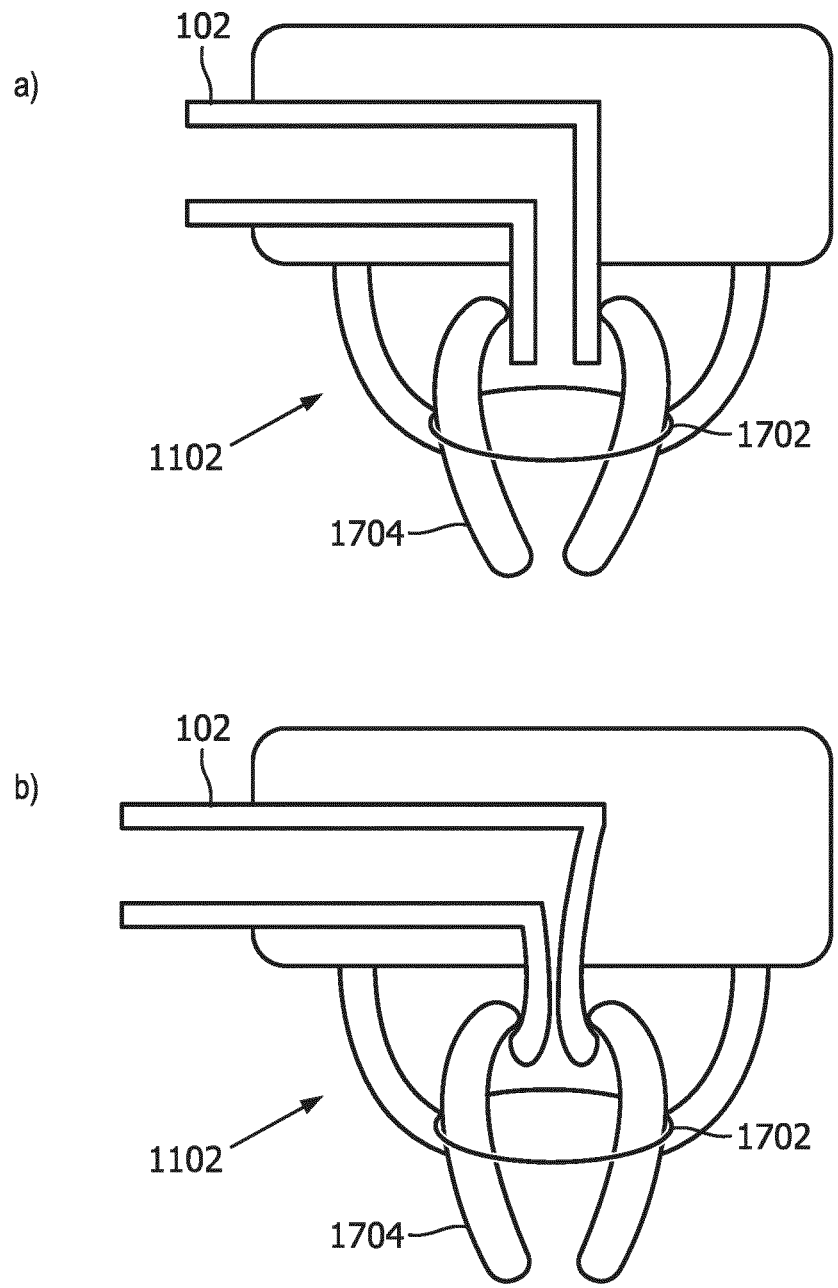
FIG. 15 shows a second example of a mechanical valve.

FIG. 15 shows a second example of a mechanical valve 1102. This alternative design for the mechanical valve 1102 clamps an elastomeric nozzle 104 mechanically a spring loaded clamp 1702. The clamp 1702 opens when pushed inside an interdental space as a squeezing force is then present against the spring bias of the clamp. FIG. 15 a) shows levers 1704 which are pushed together at their remote ends, and this opens the nozzle at the opposite, near, ends. FIG. 15 b) shows the levers opened apart by the spring bias when the remote ends are no longer clamped in an interdental space. The levers could also be in a different plane from the jet of cleaning fluid, so as not to block the jet from cleaning. This is just one example of pivoting or rocking lever design which converts compression at the remote end to nozzle opening at the near end.

A disadvantage of the mentioned mechanical valve 1102 designs is that the opening size of the nozzle 104 may depend on the force with which the nozzle 104 is pushed inside the interdental space, and the specific anatomy of an interdental space (distance etc.). More control over this can be gained using a spring loaded tip, but another solution to create an opening size less dependent on the strength of the two sided pressing force 1208 (from two teeth at the interdental space) and displacement is a bimodal system. An example of a bimodal system is a clicker, which is a metal plate spring with a preloaded tensed deformation.

In such a system there are two preferred states (i.e. open and closed). If a force is applied, the system clicks quickly to the second preferred state and if the force is released it clicks back. A spring operating system of this kind may be designed to open the mechanical valve 1102 to a predetermined size when the nozzle 104 is pushed in the interdental space.

The examples above provide different system operation functions depending on whether the nozzle is on a tooth surface or at an interdental space. These system thus enables sensing of whether a nozzle is positioned on a tooth surface or at an interdental space.

There is also a desire in some systems to enable distinction between the location of the cleaning device at an occlusal (biting) surface of a tooth or at the lateral surface. For example, different cleaning parameters are suitable for the lateral surfaces (since these are near the more sensitive gum line) and for the occlusal surfaces. The interdental spaces do not exist at occlusal surfaces.

Another aspect is based on the use of sensing of the interdental spaces, for example using any of the approaches described above (i.e. a system where the flow path is opened when the nozzle is located at an interdental space, or a system where the flow path is closed when the nozzle is located at a tooth surface), for detection of the occlusal surface. Any other known means for sensing the interdental space may also be used with the approach described below.

Figure 16:
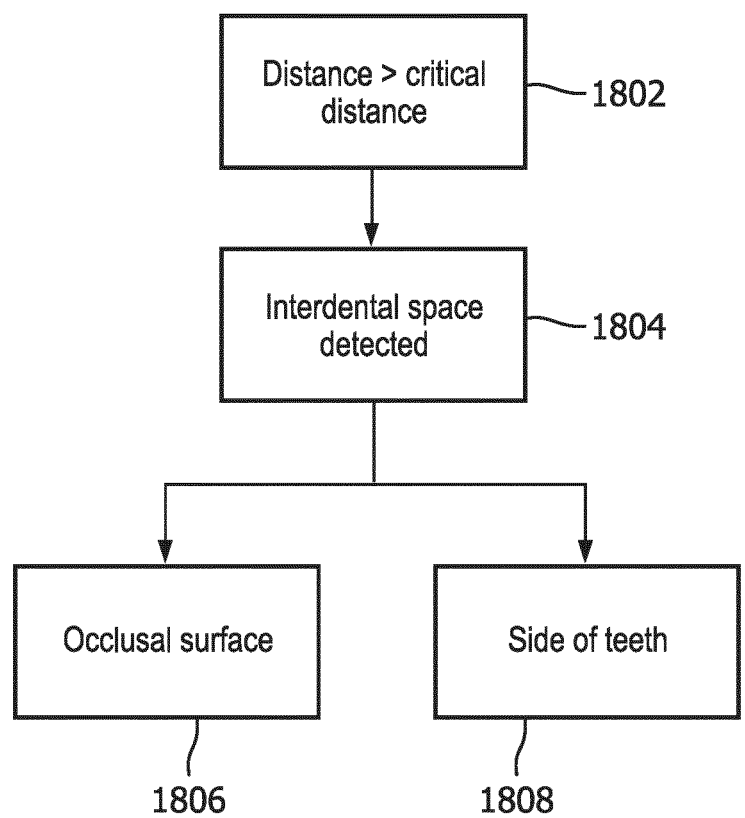
FIG. 16 shows a flow diagram for how to determine whether a nozzle is on the occlusal surface of a tooth.

FIG. 16 shows a flow diagram for how to determine whether a nozzle 104 is on the occlusal surface of a tooth 602.

The method uses detection of the interdental spaces, as well as monitoring the motion of the nozzle. Thus, in addition to the components explained above, a motion sensor is provided for measuring the displacement of the nozzle.

In step 1802, the distance travelled by the nozzle is monitored by the motion sensor. It is determined when the distance is greater than a critical distance. The critical distance is based on the size of a typical tooth, taking into account different teeth sizes. For example, the critical distance could be a minimum tooth length (e.g. 1 cm) or it could be adapted for the user taking into account the size or minimum size of their teeth. In step 1804, there is detection of an interdental space during the movement of the nozzle (i.e. to determine that the nozzle has been in an interdental space).

If the distance travelled by the nozzle is greater than the critical distance (step 1802) and an interdental space has not been detected (step 1804), then it can be determined that the nozzle is on the occlusal surface of teeth (step 1806).

Alternatively, if the distance travelled by the nozzle is greater than the critical distance (step 1802) but an interdental space is detected (step 1804), then it can be determined that the nozzle is on the side of the teeth (step 1808).

Detection of the occlusal surface for example confirms that the toothbrush is not close to the interdental space and hence gum line. This means different flow conditions may be applied. Similarly, different brushing conditions are appropriate for different tooth areas.

Figure 17:
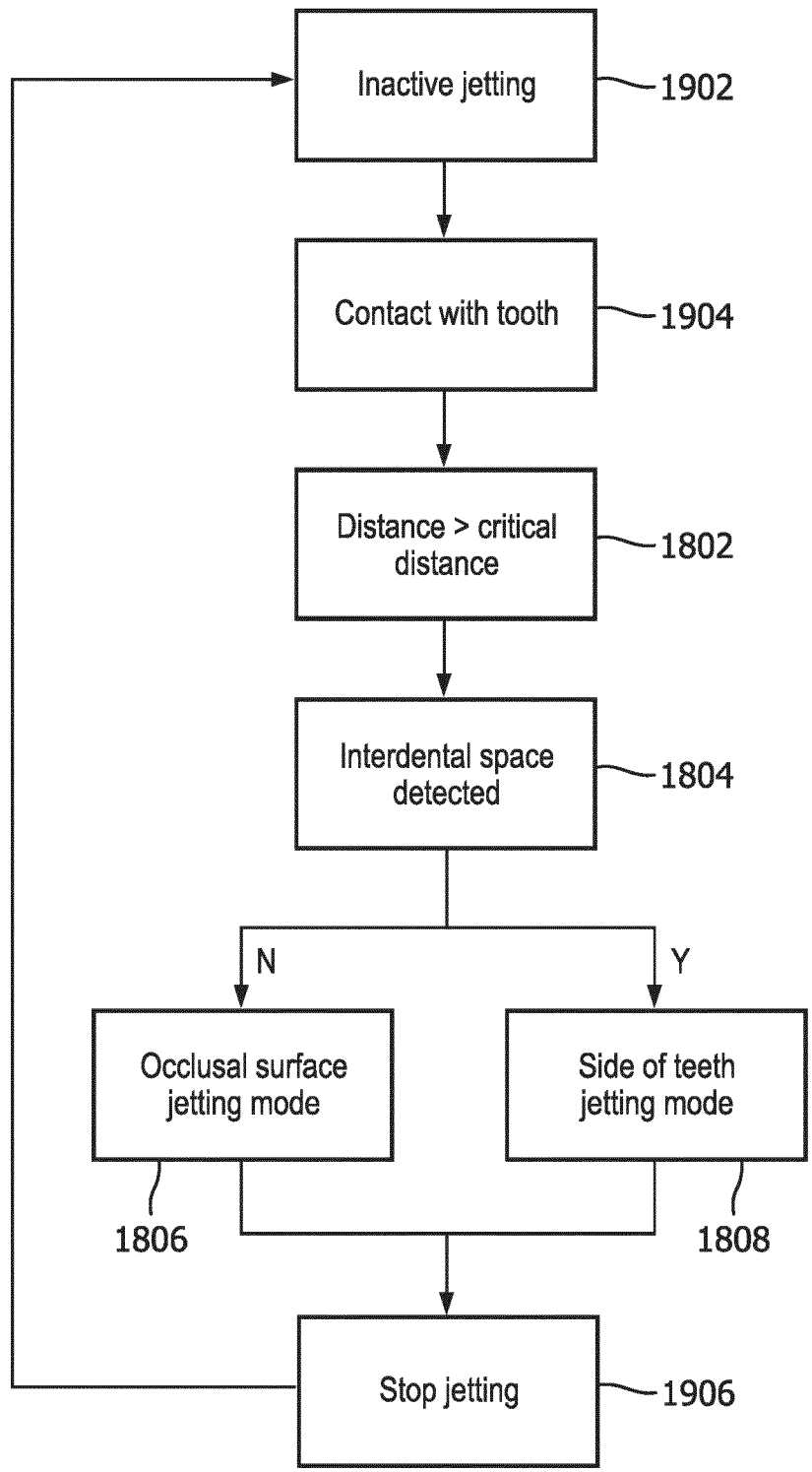
FIG. 17 shows a flow diagram of how to operate an oral irrigation system.

FIG. 17 shows a flow diagram of how to operate an oral irrigation system. At the start of oral irrigation, the oral irrigation jet may be inactive (step 1902). Three conditions need to be satisfied in order to begin oral irrigation: the nozzle of the oral irrigation system needs to be in contact with the teeth (detected in step 1904), the distance travelled needs to be larger than the critical distance (determined in step 1802) and an interdental space needs to be either detected or not detected (1804).

If an interdental space is not detected, then it can be determined that the nozzle is on the occlusal surface and the oral irrigation with an occlusal surface jetting mode can begin on the occlusal surface in step 1806. If an interdental space is detected, then it can be determined that the nozzle is on the side of the teeth and oral irrigation can begin on the side of the teeth in a jetting mode for the side of the teeth, in step 1808. Oral irrigation may occur for a pre-set amount of time, after which the oral irrigator stops the jetting (in step 1906) and continue sensing for the three conditions.

Oral irrigation may be different for the occlusal surface and the side of the teeth. Additionally, the oral irrigation may form part of a combined toothbrush and oral irrigation system.

For example, whilst the brush is operating close to the gum line it is not preferred to brush too hard or to deliver large amounts of fluids, such as fluoride to re-mineralize or bicarbonate to aid whitening. For example, whilst the brush is operating in the interdental mode or close to the gum line it is preferred to brush softer and deliver fluids for interdental or pocket cleaning; whereas whilst the brush is on the occlusal surface, brushing can be harder and large amounts of fluoride to re-mineralize the tooth can be delivered (or jetting can be interrupted to avoid build-up of excessive fluid volume in mouth). Thus, the operating parameters of both oral irrigation and brushing (e.g. brushing speed or force) may be varied based on the detection.

The method continuously monitors contact and interdental spaces, so that it can detect a transition from the occlusal surface to the side surfaces or vice versa.

Any interdental sensor can be used as part of this method for sensing the occlusal surface of teeth. The interdental sensing may be based on using a flow or pressure sensor in the fluid delivery tube as explained above or using an electrical sensor such as a resistance sensor in or on the fluid delivery tube etc. In general, a sensor signal signature variation over brushing distance may be used to differentiate between the interdental and occlusal sides.

The motion sensor used for sensing motion of the nozzle may already be present in some toothbrushes. It may comprise an accelerometer and/or gyroscope arrangement. The interdental sensor may function both as the contact sensor and as the sensor for the interdental space, as explained above. As explained above, measurements are made to determine that the brush has moved by at least the distance between two teeth (>1 cm) but has not detected any interdental spaces. Alternative measurements may be made to establish that brush is in contact with teeth and is thus not just in air.

Figure 18:
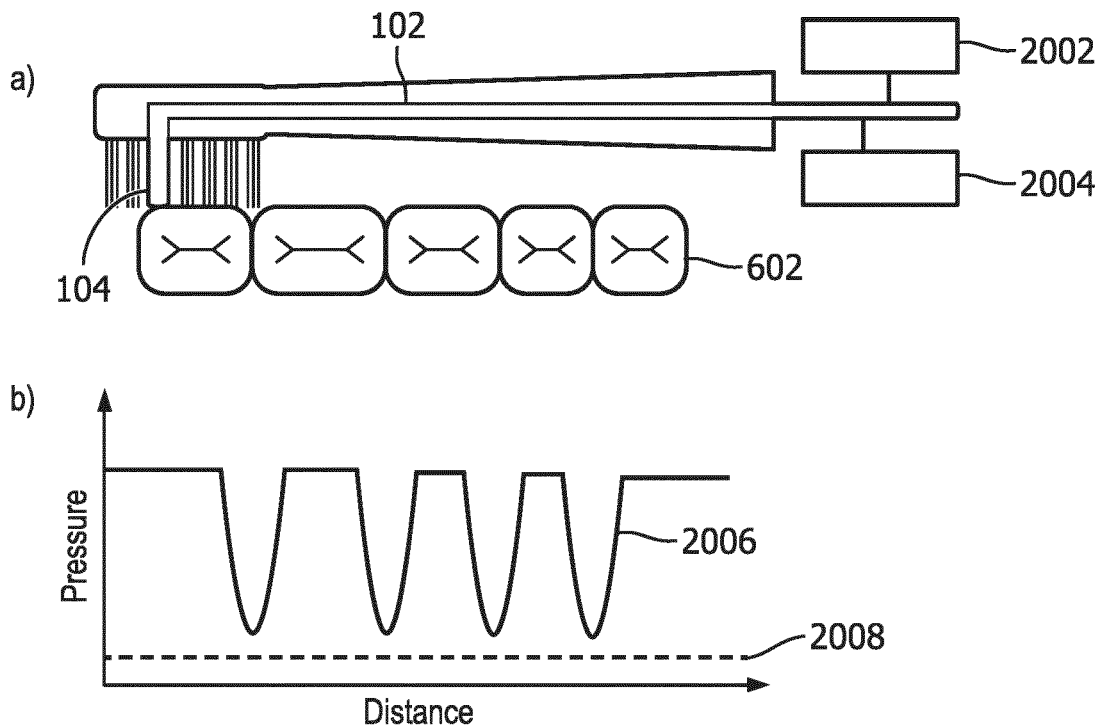
FIG. 18 shows a combined toothbrush and oral irrigation system operating on the side of teeth.

FIG. 18 shows a combined toothbrush and oral irrigation system operating on the side of teeth. FIG. 18 *a*) shows the head of the brush with a fluid delivery tube 102, a nozzle 104, an interproximal sensor 2002 and a motion sensor 2004. In this example, the interproximal 2002 sensor may be a pressure sensor. FIG. 18 *b*) shows a graph of pressure against distance corresponding to the layout of teeth 602 in FIG. 18 *a*). The pressure signal can be determined from the pressure sensor 2002 and the distance can be determined from the motion sensor 2004. The graph shows that the pressure signal 2006 drops at the interproximal spaces. For comparison, the pressure signal 2008 is shown, corresponding to the brush being in the air (no pressure differences).

Figure 19:
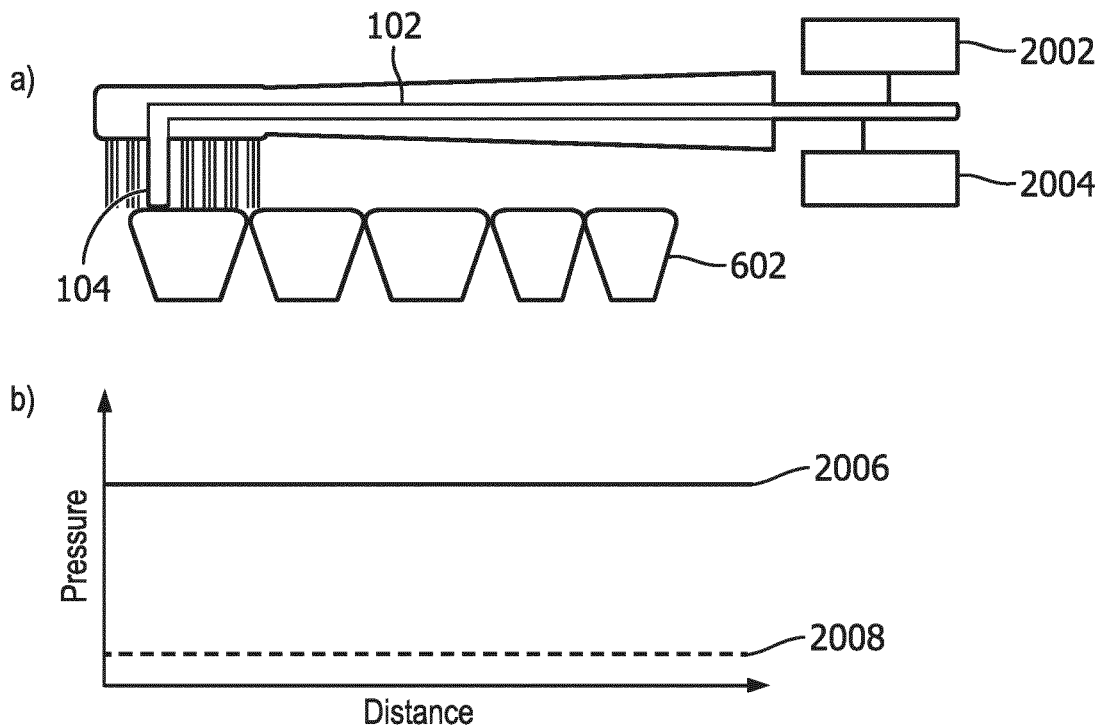
FIG. 19 shows a combined toothbrush and oral irrigation system operating on the occlusal surface of teeth.

FIG. 19 shows a combined toothbrush and oral irrigation system operating on the occlusal surface of teeth. Similarly to FIG. 18, FIG. 19 *a*) shows the head of the brush with a fluid delivery tube 102, a nozzle 104, an interproximal sensor 2002 (in this example, a pressure sensor) and a motion sensor 2004. FIG. 19 *b*) shows a graph of pressure against distance corresponding to the layout of teeth 602 in FIG. 19 *a*). In this graph, the pressure signal 2006 has no changes (or minimal changes) as there are no interdental spaces in the occlusal surface of teeth 602. For comparison, the pressure signal 2008 is shown, corresponding to the brush being in the air (no pressure differences). Whilst both signals 2008 and 2006 show no (or minimal) change, the pressure signal on the occlusal surface of the teeth 2006 exceeds that of the brush in air 2006. In this manner it can be determined if the sensor is on the occlusal surface of the teeth.

Alternatively, a flow sensor could be used as an interproximal sensor 2002. Other sensor types may also be used instead.

It can be determined that a combined toothbrush and oral irrigator are positioned on the occlusal surface of the teeth 602 by making use of an interdental sensor 2002 based upon sensing using variations in either the flow or the pressure of the fluid in the fluid delivery tube 102, thus using the same system as for interdental space detection. The nozzle 104 runs along in contact with the teeth 602 when brushing, wherein the contact with the teeth 602 breaks when the nozzle 104 reaches an interdental space. The pressure inside the fluid delivery tube 102 decreases when the tooth contact has been broken and the flow rate increases when the tooth contact is broken.

As shown in FIG. 17, the controller of the device may be configured to activate different brushing or jetting modes based on whether the nozzle 104 (and brush) is on the occlusal surface or on the side of the teeth. For example, a combined toothbrush and oral irrigation system may have a motor to operate the head of the toothbrush for brushing. The motor may then be operated differently based on a processor having detected the brush is on the occlusal surface or on the side of the teeth. Similarly, different jetting modes for the oral irrigation system may also be used for the occlusal surface and the side of the teeth.

As mentioned above, the interdental sensing may be based on any suitable sensing modality. For example, variations in the electrical resistance between two electrodes may be sensed at the nozzle 104. The nozzle 104 will run along, in contact with, the tooth and will become trapped between two teeth when the nozzle 104 reaches an interdental space. The electrical resistance between the electrodes may then be monitored. The electrical resistance will decrease when the electrodes make contact, for example when the two electrodes are brought together by compression in the interdental space.

A combination of sensor signals may be used to enhance specificity of occlusal surface and interdental sensing. This may be implemented by using additional sensor signals (e.g. brushing forces, angles) and a suitable algorithm that interprets the combination of sensor measurements to determine that the brush is brushing the occlusal surface. For example, force sensors may be used, for example to detect a force distribution (based on bending in response to pressure) or to detect brushing angle information (roll, jaw, pitch).

Figure 20:
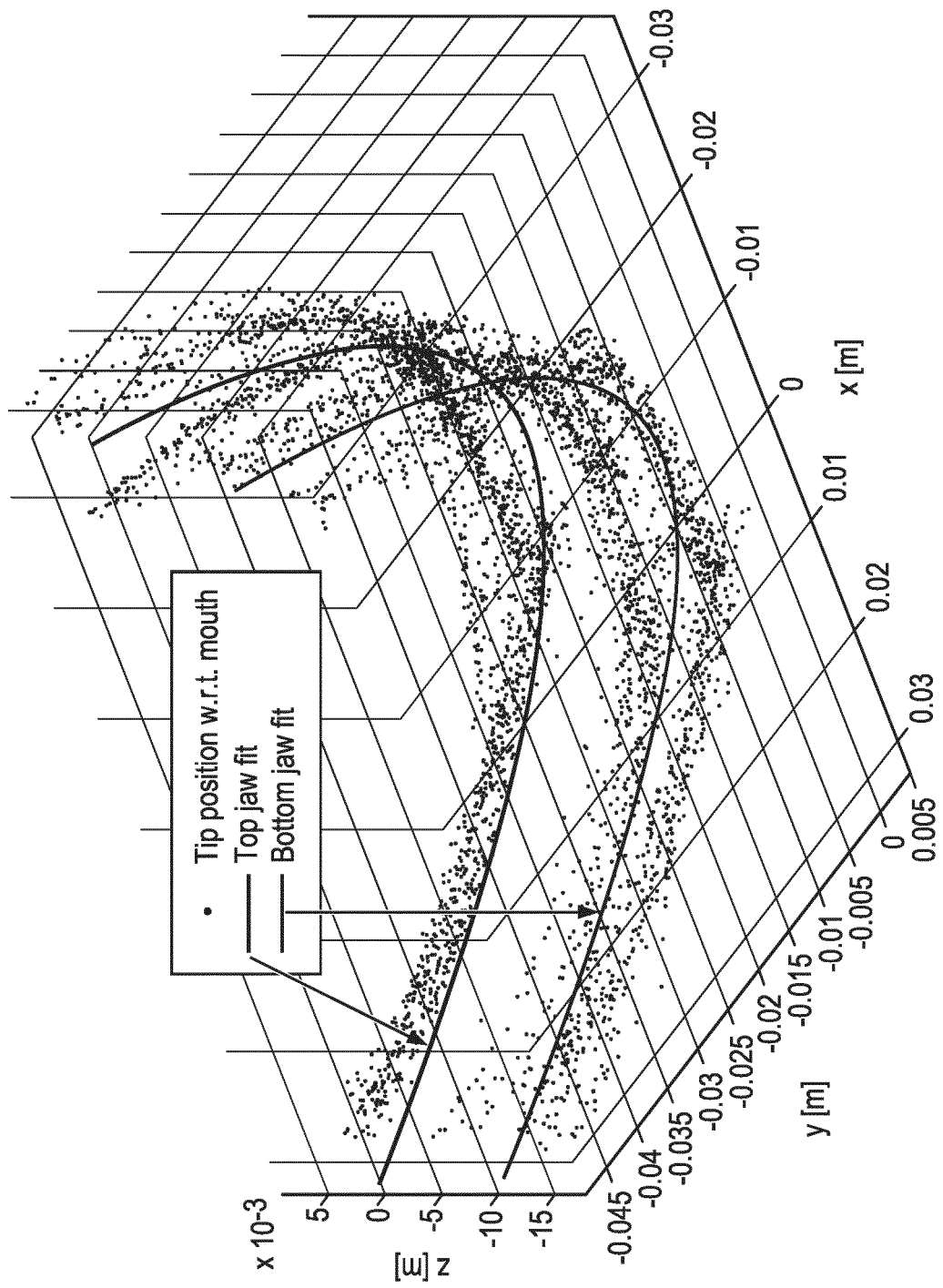
FIG. 20 shows a graph of points in three dimensions which a nozzle has been in contact with teeth during brushing.

FIG. 20 shows a graph of points in three dimensions which a nozzle 104 has been in contact with teeth during brushing based on motion sensing. It shows that position monitoring enables the location to be determined with sufficient accuracy to distinguish between tooth locations and interdental space locations.

Figure 21:
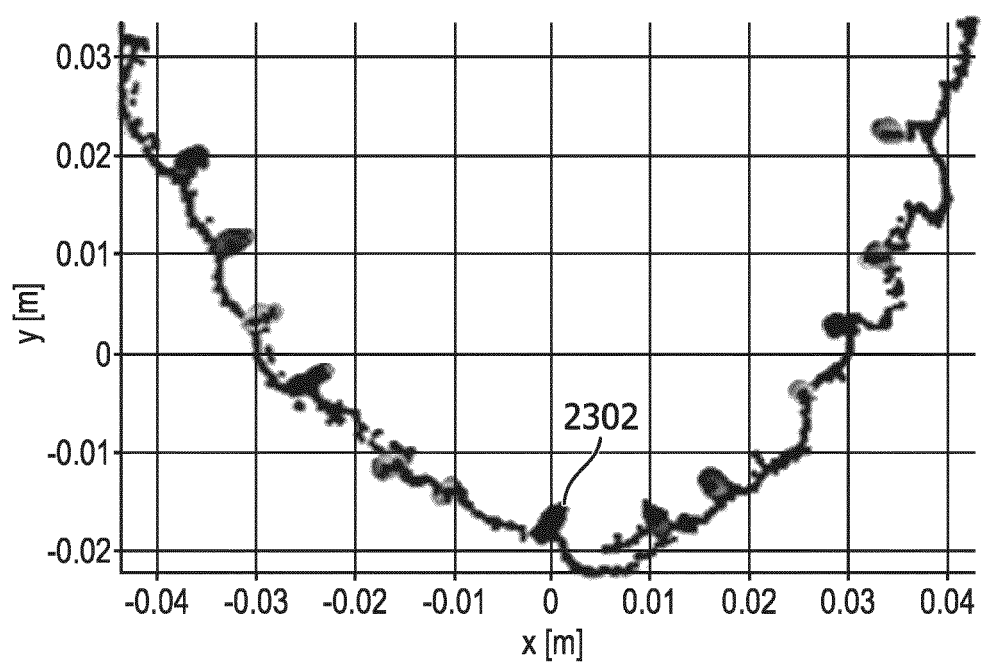
FIG. 21 shows a graph of points in three dimensions which a nozzle 104 has been in contact with teeth during brushing.

FIG. 21 shows a graph of points in two dimensions in which a nozzle 104 has been in contact with teeth during brushing. The circles 2302 in FIG. 21 represent coordinates assigned to interdental spaces. Machine learning trainings sessions could be performed in order to teach the processor to distinguish interdental, occlusal and in-air fluid pressure and resistance signal signatures in relation to angle combinations and/or interdental location coordinates. Once the angle combinations and/or (3D) coordinates of the interdental spaces have been determined with the training session, this information may be stored in a memory and used by the processor in future cleaning sessions.

The skilled person would be readily capable of developing a controller and/or a processor for carrying out any herein described method. Thus, each step of a flow chart may represent a different action performed by a controller and/or a processor, and may be performed by a respective module of the processing controller and/or controller.

As discussed above, embodiments make use of a controller. The controller can be implemented in numerous ways, with software and/or hardware, to perform the various functions required. A processor is one example of a controller which employs one or more microprocessors that may be programmed using software (e.g., microcode) to perform the required functions. A controller may however be implemented with or without employing a processor, and also may be implemented as a combination of dedicated hardware to perform some functions and a processor (e.g., one or more programmed microprocessors and associated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor or controller.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

If the term "adapted to" is used in the claims or description, it is noted the term "adapted to" is intended to be equivalent to the term "configured to".

Any reference signs in the claims should not be construed as limiting the scope.

The invention claimed is:

1. A system for oral irrigation comprising:
a fluid delivery tube with a proximal end and a distal end, wherein the proximal end is configured to receive fluids for oral irrigation;
a nozzle at the distal end of the fluid delivery tube with an aperture for fluid delivery;
a pump configured to pump fluids through the fluid delivery tube based on a pump configuration;
a sensor for sensing a pressure or flow rate in the fluid delivery tube; and
a controller configured to:
detect whether the nozzle is in an interdental space based on the sensor detecting a pressure drop or a flow rate increase in the fluid delivery tube; and
adjust the pump configuration based on the nozzle being in an interdental space.

2. The system of claim 1, wherein adjusting the pump configuration comprises:
controlling the pump to pump a first fluid at a first flow rate through the fluid delivery tube based on the controller detecting the nozzle is not in an interdental space; and
controlling the pump to pump a second fluid at a second flow rate through the fluid delivery tube based on the controller detecting the nozzle is in an interdental space.

3. The system of claim 2 further comprising a fluid reservoir for providing the first and/or the second fluid.

4. The system of claim 3, further comprising a switch, wherein the controller is configured to activate the switch based on detecting a pressure drop or flow rate increase and wherein activating the switch causes the pump to change the fluid flowing through the fluid delivery tube to change from the first fluid to the second fluid.

5. The system of claim 2, wherein the first fluid is a gas and the second fluid is liquid.

6. The system of claim 5, further comprising one or more air inlets for providing the first fluid.

7. The system of claim 2, wherein the controller is further configured to control the pump to return to pumping the first fluid at the first flow rate through the fluid delivery tube after the pump has pumped the second fluid at the second flow rate through the fluid delivery tube for a predetermined time period.

8. The system of claim 2, wherein the controller is further configured to control the pump to pump the first fluid at a first flow rate through the fluid delivery tube after pumping the second fluid at the second flow rate through the fluid delivery tube and the sensor detecting a pressure increase or a flow rate decrease in the fluid delivery tube.

9. The system of claim 1, wherein:
the nozzle comprises a conformable material.

10. The system of claim 9 wherein the nozzle (104) comprises a mechanical spring loaded valve at the end of the nozzle.

11. The system of claim 1, wherein the aperture of the nozzle is configured such that the fluid is ejected from the nozzle in a direction which deviates from the direction of the nozzle and
wherein the direction of the fluid ejected from the nozzle changes with respect to time, wherein the change in direction is towards the direction of the nozzle.

12. The system of any one of claim 1, further comprising:
a toothbrush head comprising a plurality of protruding bristles, wherein the toothbrush head further comprises the nozzle.

13. A method for controlling an oral irrigation system, the method comprising:
controlling a pump to pump fluids through a fluid delivery tube based on a pump configuration;
detecting a pressure and/or a flow rate in the fluid delivery tube; and
detecting whether the oral irrigation system is in an interdental space based on detecting a pressure drop or a flow rate increase in the fluid delivery tube; and
adjusting the pump configuration based on the oral irrigation system being in an interdental space.

14. A handle of an oral irrigation system, wherein the handle comprises:
an interface for connecting the handle to an oral irrigation head;
a fluid delivery tube for delivering fluid to the oral irrigation head;
a pump configured to pump fluids to the fluid delivery tube based on a pump configuration; and a processor for controlling the pump, said processor performing the steps of:
  detecting a pressure and/or a flower rate in the fluid delivery tube; and
  detecting whether the oral irrigation system is in an interdental space based on detecting a pressure drop or a flow rate increase in the fluid delivery tube; and
  adjusting, the pump configuration based on the oral irrigation system being in an interdental space.

* * * * *